(12) United States Patent
Park et al.

(10) Patent No.: US 11,327,486 B2
(45) Date of Patent: May 10, 2022

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Jae Yong Park, Suwon-si (KR); Sukki Min, Suwon-si (KR); Hochoul Jung, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 240 days.

(21) Appl. No.: 16/545,204

(22) Filed: Aug. 20, 2019

(65) Prior Publication Data
US 2020/0192357 A1 Jun. 18, 2020

(30) Foreign Application Priority Data

Dec. 17, 2018 (KR) .......................... 10-2018-0162926

(51) Int. Cl.
| | |
|---|---|
| *G05D 1/00* | (2006.01) |
| *G05D 1/02* | (2020.01) |
| *B60W 20/50* | (2016.01) |
| *B60W 50/02* | (2012.01) |

(52) U.S. Cl.
CPC .......... *G05D 1/0061* (2013.01); *B60W 20/50* (2013.01); *G05D 1/0214* (2013.01); *B60W 2050/0215* (2013.01)

(58) Field of Classification Search
CPC ... G05D 1/0061; G05D 1/0214; B60W 20/50; B60W 2050/0215
See application file for complete search history.

(56) References Cited

U.S. PATENT DOCUMENTS 9,195,232 B1 * 11/2015 Egnor ................... B60W 10/20
2021/0129855 A1 * 5/2021 Nakao .................. G05D 1/0055

* cited by examiner

*Primary Examiner* — Nicholas Kiswanto
*Assistant Examiner* — Jamal A Shah
(74) *Attorney, Agent, or Firm* — Lempia Summerfield Katz LLC

(57) ABSTRACT

A vehicle can safely transfer the control of a vehicle to a driver when a fault occurs in an autonomous navigation system. In particular, the vehicle includes: a first sensor to obtain front information of the vehicle; a second sensor to acquire peripheral information of the vehicle; a first controller to perform an autonomous driving function based on the front information; a second controller to perform the autonomous driving function based on the obtained front information and the peripheral information; and a communicator to transmit the front information and the peripheral information to the second controller. The first controller may stop the transmission of a control signal of the first controller when a failure has occurred in the first controller, and the second controller may stop the transmission of a control signal of the second controller when a failure occurs in the second controller.

12 Claims, 8 Drawing Sheets

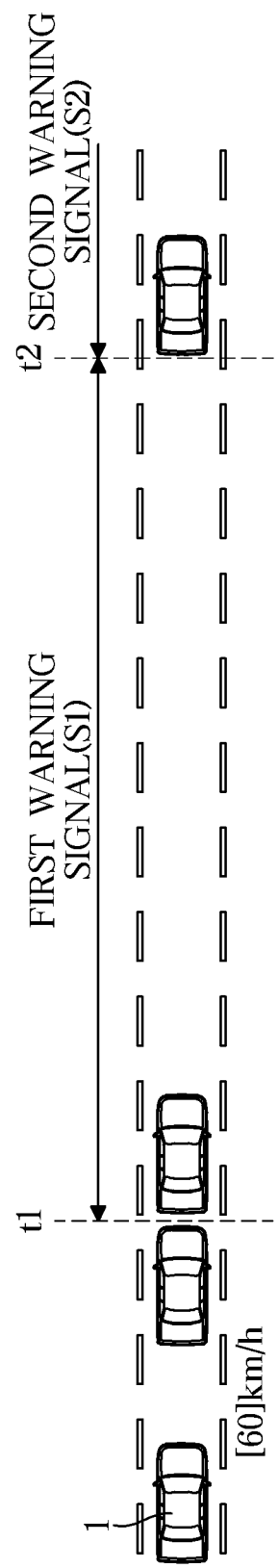

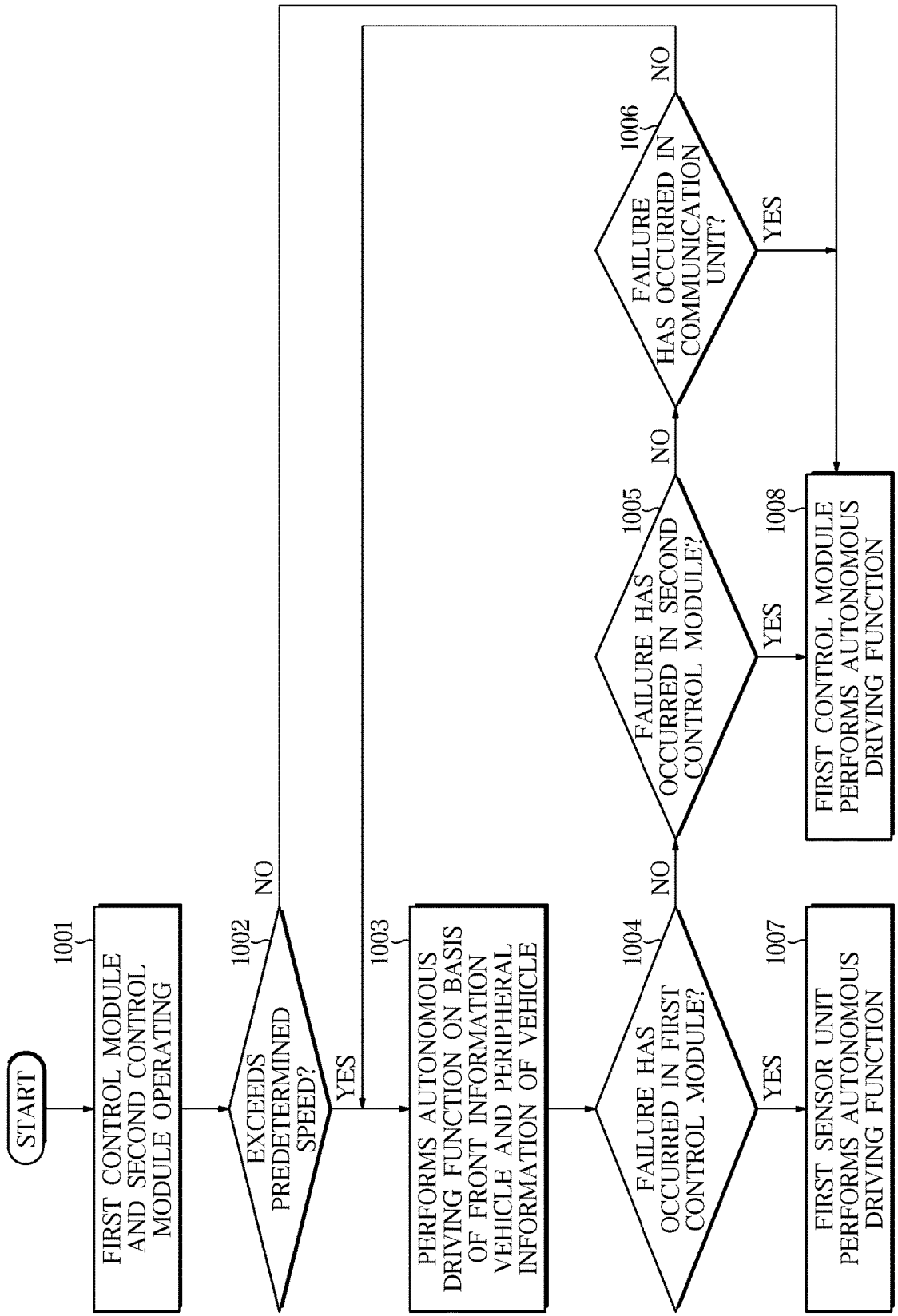

VEHICLE AND CONTROL METHOD THEREOF

CROSS-REFERENCE TO RELATED APPLICATION

This application claims priority to and the benefit of Korean Patent Application No. 10-2018-0162926, filed on Dec. 17, 2018, the entire contents of which are incorporated herein by reference.

FIELD

The present disclosure relates to a vehicle that carries out an operation for an autonomous vehicle and a control method thereof.

BACKGROUND

The statements in this section merely provide background information related to the present disclosure and may not constitute prior art.

As technologies of autonomous driving have been developed, an autonomous driving system is desired to provide more improved functions beyond a simple driving assistance, such as functions to control the steering/braking of an autonomous vehicle and cope with an emergency situation without intervention by a driver.

Particularly, the advanced autonomous driving system is not obliged to observe the front of the driver. Therefore, it is required to control the vehicle safely until the driver takes over the control of the autonomous vehicle even when the autonomous driving system fails.

Although various studies have been carried out to address this situation, the studies utilize separate modules including a communication module to implement functions for the situation. However, we have discovered that the studies do not provide any solution for a situation where the communication module fails and thus we have found that it is desired to detect a failure of the communication module without requiring a separate module.

SUMMARY

The present disclosure provides a vehicle and a control method thereof that can safely transfer the control of a vehicle to a driver without a separate module when a fault occurs in an autonomous navigation system of the vehicle.

Additional aspects of the present disclosure will be set forth in part in the description which follows and, in part, will be obvious from the description, or may be learned by practice of the present disclosure.

A vehicle according to one form includes: a first sensor for obtaining front information of the vehicle; a second sensor for acquiring peripheral information of the vehicle; a communicator for transmitting the front information of the vehicle and the peripheral information of the vehicle to a second controller; a first controller that performs an autonomous driving function based on the front information; and the second controller for performing the autonomous driving function on the basis of the front information of the vehicle and the peripheral information of the vehicle. In particular, the first controller stops transmitting a control signal of the first controller when it is determined that a failure has occurred in the first controller, and the second controller may stop the transmitting a control signal of the second controller when it is determined that a failure has occurred in the second controller.

The vehicle in one form further includes an auxiliary controller configured to determine whether a failure has occurred in the first controller, and the auxiliary controller controls the first controller to stop the communication when it is determined that a failure has occurred in the first controller, and the first sensor may perform the autonomous driving function based on the front information.

In another form, the second controller may stop the transmission of the control signal from the second controller to the first controller when it is determined that a failure has occurred in the second controller.

Also, the second controller can transmit a failure signal of the communicator to the first controller when it is determined that a failure has occurred in the communicator.

The vehicle may further include an output unit configured to output a first warning signal when a failure occurs in at least one of the first controller, the second controller, or the communicator.

The output unit may output a second warning signal when a predetermined time has elapsed since the output of the first warning signal.

The second controller may be activated when the vehicle travels with a speed greater than a predetermined speed.

A vehicle control method according to another form of the present disclosure includes: obtaining, by a first sensor, front information of a vehicle; obtaining, by a second sensor, peripheral information of the vehicle; performing, by a first controller, an autonomous driving function based on the front information; performing, by a second controller, the autonomous driving function on the basis of the front information of the vehicle and the peripheral information of the vehicle; stopping, by the first controller, transmitting a control signal when it is determined that a failure has occurred in the first controller; and stopping, by the second controller, transmitting a control signal of the second controller when it is determined that a failure has occurred in the second controller.

The vehicle control method according to one form may further include, when it is determined that a failure has occurred in the first controller, performing, by a first sensor, the autonomous driving function based on the front information.

The control for stopping the transmission of the control signal of the second controller may include stopping the transmission of the control signal from the second controller to the first controller when it is determined that a failure has occurred in the second controller.

The vehicle control method according to another form may include transmitting a failure signal of a communicator to the first controller when it is determined that a failure has occurred in the communicator.

The vehicle control method may further include outputting a first warning signal when a failure occurs in at least one of the first controller, the second controller, or the communicator.

The vehicle control method may further include outputting a second warning signal when a predetermined time has elapsed since the output of the first warning signal.

In other form, the second controller may be activated when the vehicle travels at a predetermined speed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 7 is a view for explaining the operation of an output unit; and

FIG. 8 is a flowchart.

Figure 1:
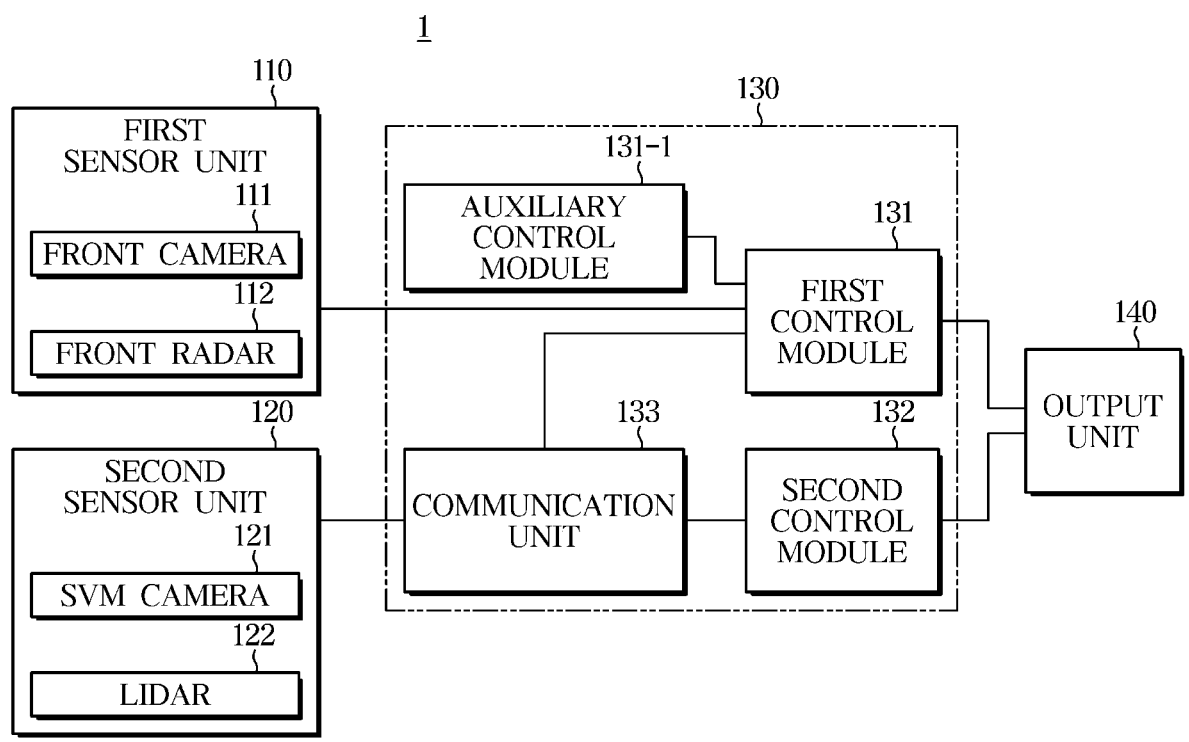
FIG. 1 is a control block diagram.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Not all elements of forms of the present disclosure will be described, and description of what are commonly known in the art or what overlap each other in the forms will be omitted. The terms as used throughout the specification, such as "~part," "~module," "~unit," "~member," "controller," "~block," etc., may be implemented in software and/or hardware (e.g., a processor), and a plurality of "~parts," "~modules," "~members," or "~blocks" may be implemented in a single element, or a single "~part," "~module," "~member," or "~block" may include a plurality of elements.

It will be further understood that the term "connect" or its derivatives refer both to direct and indirect connection, and the indirect connection includes a connection over a wireless communication network.

The terms "include (or including)" or "comprise (or comprising)" are inclusive or open-ended and do not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and forms of the present disclosure will be described with reference to accompanying drawings.

FIG. 1 is a control block diagram of a vehicle according to one form of the present disclosure.

Referring to FIG. 1, a vehicle 1 may include a first sensor unit 110, a second sensor unit 120, a communication unit 133, a first control module 131, a second control module 132, and an output unit 140.

The first sensor unit 110 may include an arrangement for obtaining the front information of the vehicle 1

Specifically, the first sensor unit 110 may include a front camera 111 and a front radar 112 provided in front of the vehicle.

The second sensor unit 120 can acquire the peripheral information of the vehicle. Specifically, the second sensor unit 120 may include an SVM camera 121 and a lidar 122.

Meanwhile, the cameras 111 and 121 provided in the vehicle can be provided on side mirrors of the vehicle 1 to acquire images of the surroundings of the vehicle 1.

The cameras 111 and 121 installed in the vehicle 1 may include a CCD (Charge-Coupled Device) camera or a CMOS color image sensor. Herein, both the CCD and the CMOS refer to a sensor that converts light received through the lenses of the cameras 111 and 121 into electric signals. Specifically, the CCD (Charge-Coupled Device) cameras are devices for converting an image into an electric signal using a charge-coupled device. In addition, CIS (CMOS Image Sensor) refers to a low-power type image pickup device having a CMOS structure and serves as an electronic film of a digital device. Generally, the CCD is more sensitive than the CIS and is widely used in the vehicle 1, but the present disclosure is not limited thereto.

The front radar may be configured to emit an electromagnetic wave of a microwave (microwave, 10 cm to 100 cm wavelength) to an object, to receive the electromagnetic wave reflected from the object, and to derive the distance, direction, altitude and the like from the object.

The SVM camera 121 can be provided on the front, rear, and side of the vehicle to acquire images.

The lidar 122 may be provided as a device that emits laser pulses and reflects light reflected from a surrounding object to measure the distance to the object and thereby accurately depict the surroundings.

The communication unit 133 can transmit the vehicle front information and the peripheral information of the vehicle obtained by the first sensor unit 110 to the second control module 132 to be described later.

Specifically, the communication unit 133 may transmit the vehicle front information obtained by the first sensor unit 110 and information related to the vehicle periphery acquired by the second sensor unit 120 to the second control module 132, which will be described later. The communication unit 133 may include one or more components that enable communication with an external device, and may include at least one of a short-range communication module, a wired communication module, or a wireless communication module, for example.

The communication unit 133 may be provided as an Ethernet communication module that transmits data using a CSMA/CD (Carrier Sense Multiple Access with Collision Detection) scheme.

The first control module 131 may be configured to perform an autonomous driving function based on the front information. On the other hand, the second control module 132 may be configured to perform the autonomous driving function on the basis of the front information of the vehicle and the peripheral information of the vehicle.

The autonomous driving function may include operations such as automatically controlling steering and braking of the vehicle, controlling the vehicle in an emergency, and warning of a dangerous situation.

On the other hand, the first control module 131 can perform the autonomous driving function based on the front information of the vehicle. According to one form, the operation performed by the first control module 131 may include a lane keeping operation and an inter-vehicle distance maintaining operation.

On the other hand, if it is determined that the first control module 131 has failed, the first control module 131 can control to stop the transmission of a control signal of the first control module 131.

An auxiliary control module 131-1 may be configured as an independent module for determining whether a failure of the first control module 131 occurs.

The auxiliary control module 131-1 may be provided as a power management integrated circuit.

The power management integrated circuit (PMIC) may be configured as an integrated circuit for managing the power requirements of a host system. The PMIC may include electronic power conversion and/or associated power control functions.

On the other hand, if it is determined that a failure has occurred in the first control module 131, the first control module controls to stop the communication. In this case, the first sensor unit can perform the autonomous driving function based on the front information.

That is, although the first control module 131 can perform the autonomous driving function based on the front information, the first sensor unit 110 provided in the vehicle can also perform the autonomous driving function based on the modules provided therein. And, if it is determined that the first control module 131 cannot operate normally as described above, the first sensor unit 110 itself can perform the autonomous driving function such as a lane and an inter-vehicle distance maintenance function.

The second control module 132 may stop the transmission of a control signal from the second control module 132 to the first control module when it is determined that a failure has occurred in the second control module 132.

The second control module 132 may be an AP (Application Processor) that performs the autonomous driving function. The autonomous driving function performed by the second control module 132 may further use the SVM camera 121 and the lidar 122 to perform the autonomous driving function in a situation where the vehicle exceeds a predetermined speed. In particular, the autonomous driving function performed by the second control module 132 increases the detectable area for the object and the opponent vehicle around the autonomous driving function performed by the first control module 131.

The second control module 132 can transmit a failure signal of the communication unit 133 to the first control module 131 when it is determined that a failure has occurred in the communication unit 133. The first control module 131 and the second control module 132 can send and receive the respective control signals through the communication unit 133. However, when a failure occurs in the communication unit 133, the execution of the autonomous driving function of the second control module 132 can be stopped.

Meanwhile, the auxiliary control module 131-1, the first control module 131, and the second control module 132 store data for a program reproducing an algorithm or a memory (not shown) for storing data for a program reproducing the algorithm, and a processor (not shown) that performs the above-described operation using the data stored in a memory (not shown). At this time, the memory and the processor may be implemented as separate chips. Alternatively, the memory and the processor may be implemented on a single chip.

The output unit 140 may output a first warning signal when a failure occurs in at least one of the first control module 131, the second control module 132, or the communication unit 133.

The output unit 140 may be configured to output a warning signal to the driver when the above-described failure occurs. According to one form, the output unit 140 may include an output such as from a display and a speaker.

The output unit 140 may output a second warning signal when a predetermined time has elapsed since the output of the first warning signal.

The output unit 140 outputs the first warning signal to transfer the control right to the driver. Therefore, if a control unit does not transfer the control right even after the output unit outputs the first warning signal, the second warning signal may be output again to guide the driver to use the control right.

Meanwhile, the first control module 131, the second control module 132, the auxiliary control module 131-1, and the communication unit 133 described in FIG. 1 may be provided in the configuration of an autonomous driving system 130.

At least one component may be added or deleted corresponding to the performance of the components of the vehicle shown in FIG. 1. And, it will be readily understood by those skilled in the art that the mutual position of the components can be changed corresponding to the performance or structure of the system.

In the meantime, each of the components shown in FIG. 1 denotes a hardware component such as software and/or a Field Programmable Gate Array (FPGA) and an Application Specific Integrated Circuit (ASIC).

Figure 2:
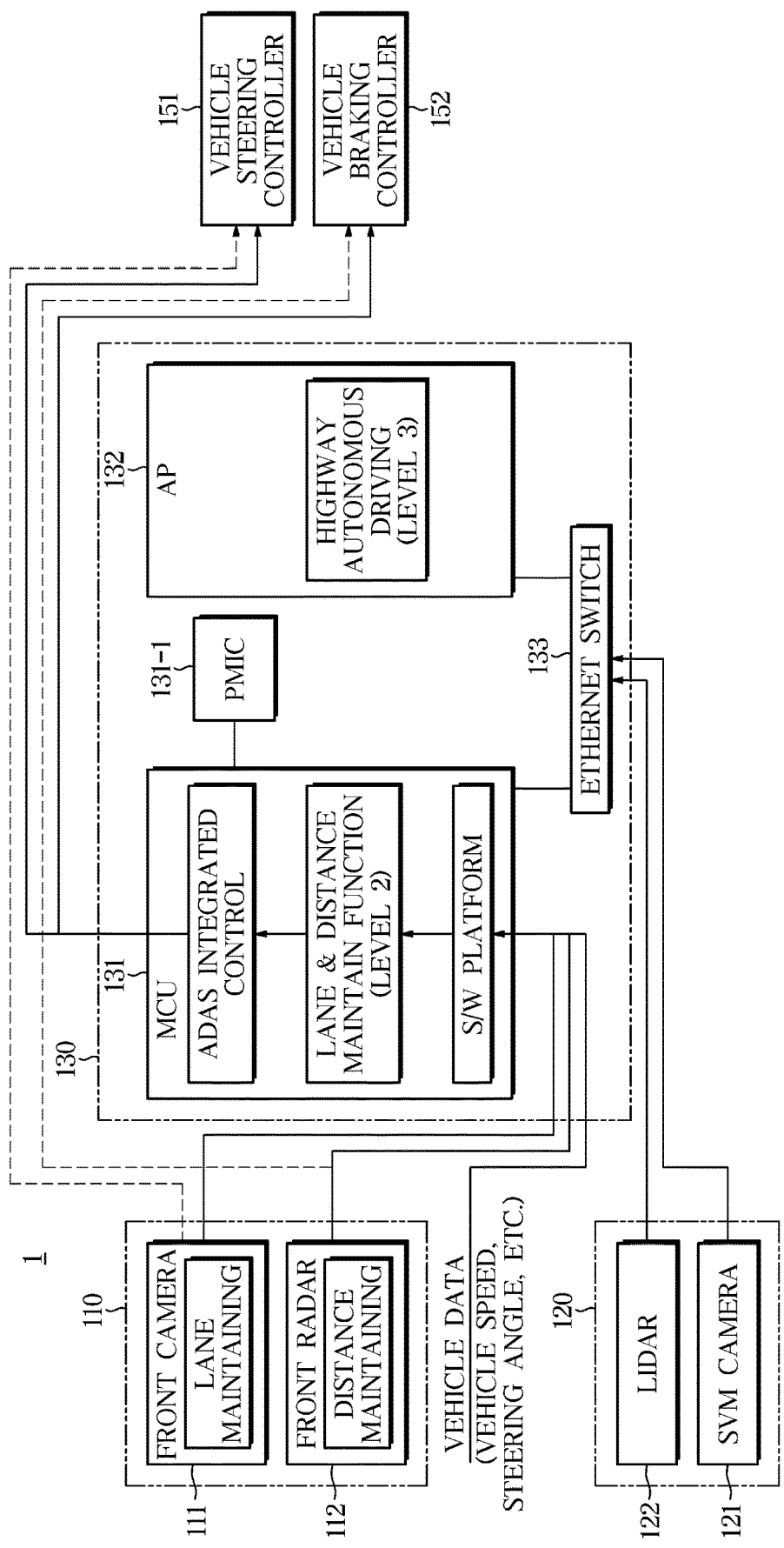
FIG. 2 is a detailed configuration diagram of an autonomous driving system.

FIG. 2 is a detailed configuration diagram of the autonomous driving system 130 and the vehicle 1 according to one form of the present disclosure.

Referring to FIG. 2, the autonomous driving system 130 may include the first control module (MCU) 131 and the second control module (AP) 132. The first control module (MCU) 131 and the second control module (AP) 132 may be connected to the communication unit. And, as described above, the communication unit 133 may include an Ethernet switch.

Meanwhile, the first control module 131 may perform an autonomous driving function of maintaining the lane and the inter-vehicle distance.

The second control module 132 can perform the autonomous driving function of the vehicle when the vehicle exceeds a predetermined speed. Particularly, when the vehicle is driving on the road surface such as a highway, the second control module 132 can perform the autonomous driving function of the vehicle. Meanwhile, as described above, the second control module 132 may receive vehicle periphery information by additionally using a configuration such as the SVM camera 121 and the lidar 122 provided in the second sensor unit 120.

In addition, the first sensor unit 110 may perform the lane keeping function based on the front information of the vehicle, and a headway distance maintenance function by the front radar during the autonomous driving function.

Further, the front information of the vehicle obtained by the first sensor unit 110 is transmitted to the first control module via CAN-FD, and may be transmitted to the second control module through the communication unit 133.

The data acquired by the first sensor unit 110 and the data related to the lidar 122 and the data related to the SVM camera 121 included in the second sensor unit 120 can be transmitted to the second control module 132 through the communication unit.

The auxiliary control module connected to the first control module 131 may detect whether a failure has been issued to the first control module 131 and may block the communication of the first control module 131.

Meanwhile, in the case where the first control module 131 does not have a failure, the lane and inter-vehicle distance maintenance function can be performed by the first control module 131. Therefore, the first sensor unit 110 may not perform the lane and inter-vehicle distance maintenance functions.

The first control module 131 and the second control module 132 may control a vehicle steering controller 151 and a vehicle braking controller 152 provided in the vehicle to perform the autonomous driving function of the vehicle.

On the other hand, the configuration detailed in FIG. 2 is only one form for explaining the operation of the present disclosure, and there is no limitation on the operation of each module.

Figure 3:
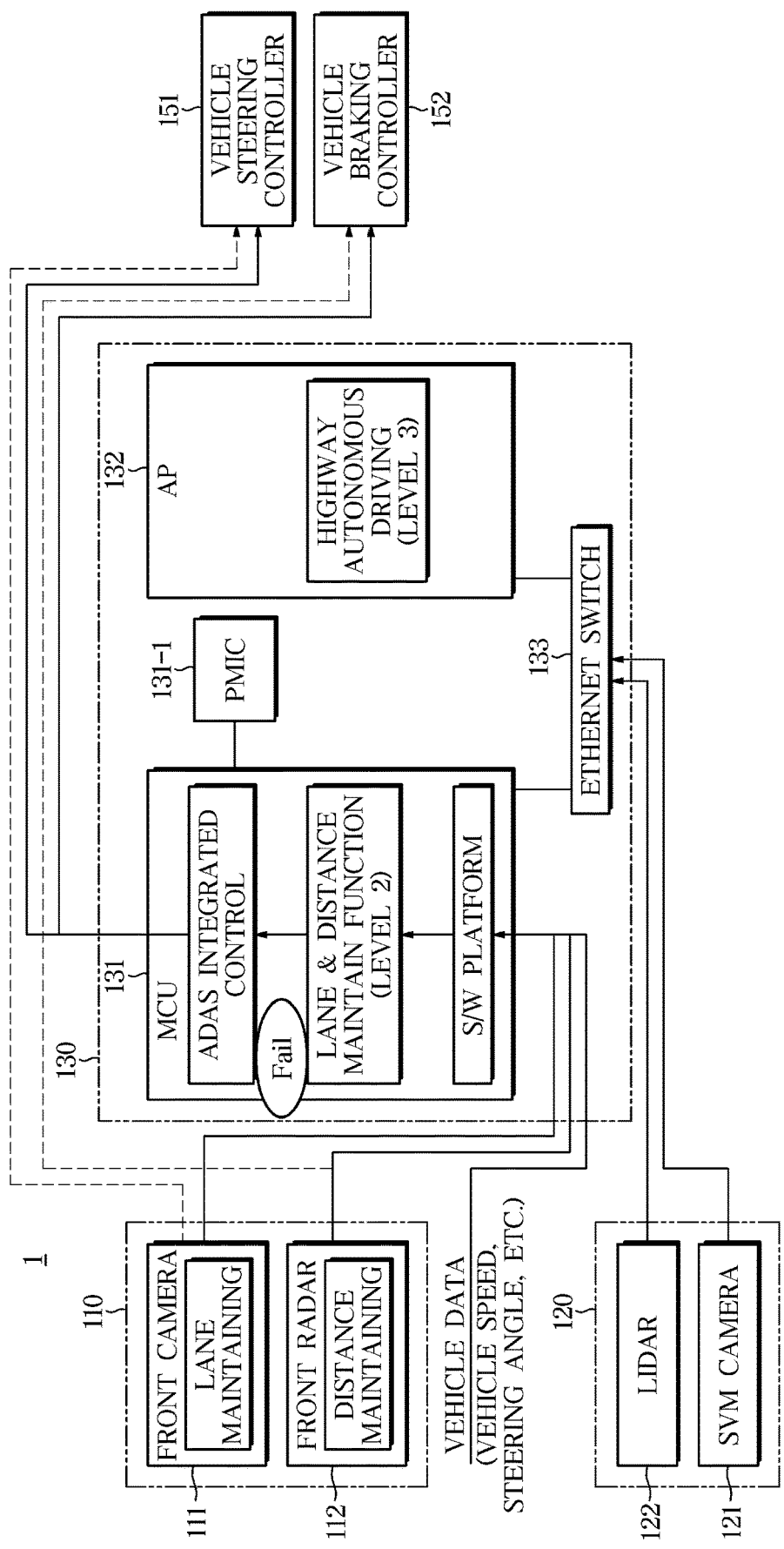
FIG. 3 is a view for explaining an operation when a failure occurs in a first control module.

FIG. 3 is a diagram for explaining an operation when a failure occurs in the first control module 131 according to one form of the present disclosure.

Referring to both FIGS. 2 and 3, when a failure occurs in the first control module 131 or both the first control module and the second control module 132, the auxiliary control module 131-1 may detect communication with the first control module 131 and block communication with the first control module and an external sensor.

In addition, the first sensor unit 110 may stop the data communication with the first control module 131, so that the first sensor unit 110 may detect the failure status of the first control module 131 or the first control module 131 and the second control module 132.

In this case, the first sensor unit 110 can transmit the control signal by activating the front camera lane keeping function and the front radar distance keeping function.

Figure 4:
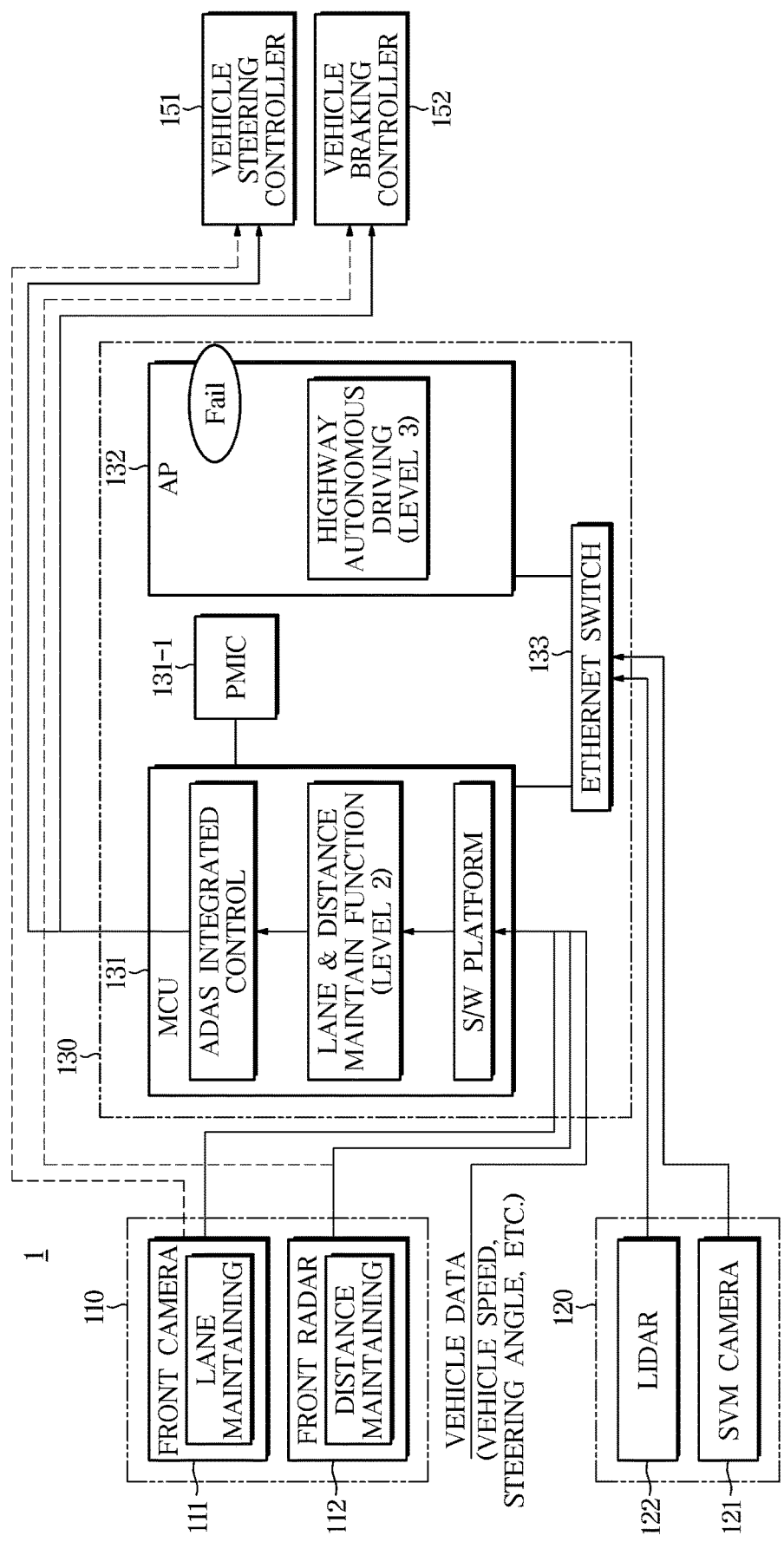
FIG. 4 is a view for explaining an operation when a failure occurs in a second control module.

FIG. 4 is a diagram for explaining an operation when a failure occurs in the second control module 132 according to one form of the present disclosure.

Referring to FIGS. 2 and 4, if the second control module 132 determines that a failure has occurred in the second control module 132, the second control module 132 can stop the autonomous driving function performed by the second control module 132.

Therefore, the control signal transmitted by the second control module 132 cannot be transmitted to the first control module 131, and the first control module 131 may transmit a calculated vehicle steering/braking control signal through the lane and inter-vehicle distance maintaining function to perform the autonomous driving function. In this case, the first sensor module 110 may not operate the lane and inter-vehicle distance maintenance functions because the first control module 131 performs the lane and inter-vehicle distance maintenance function.

Figure 5:
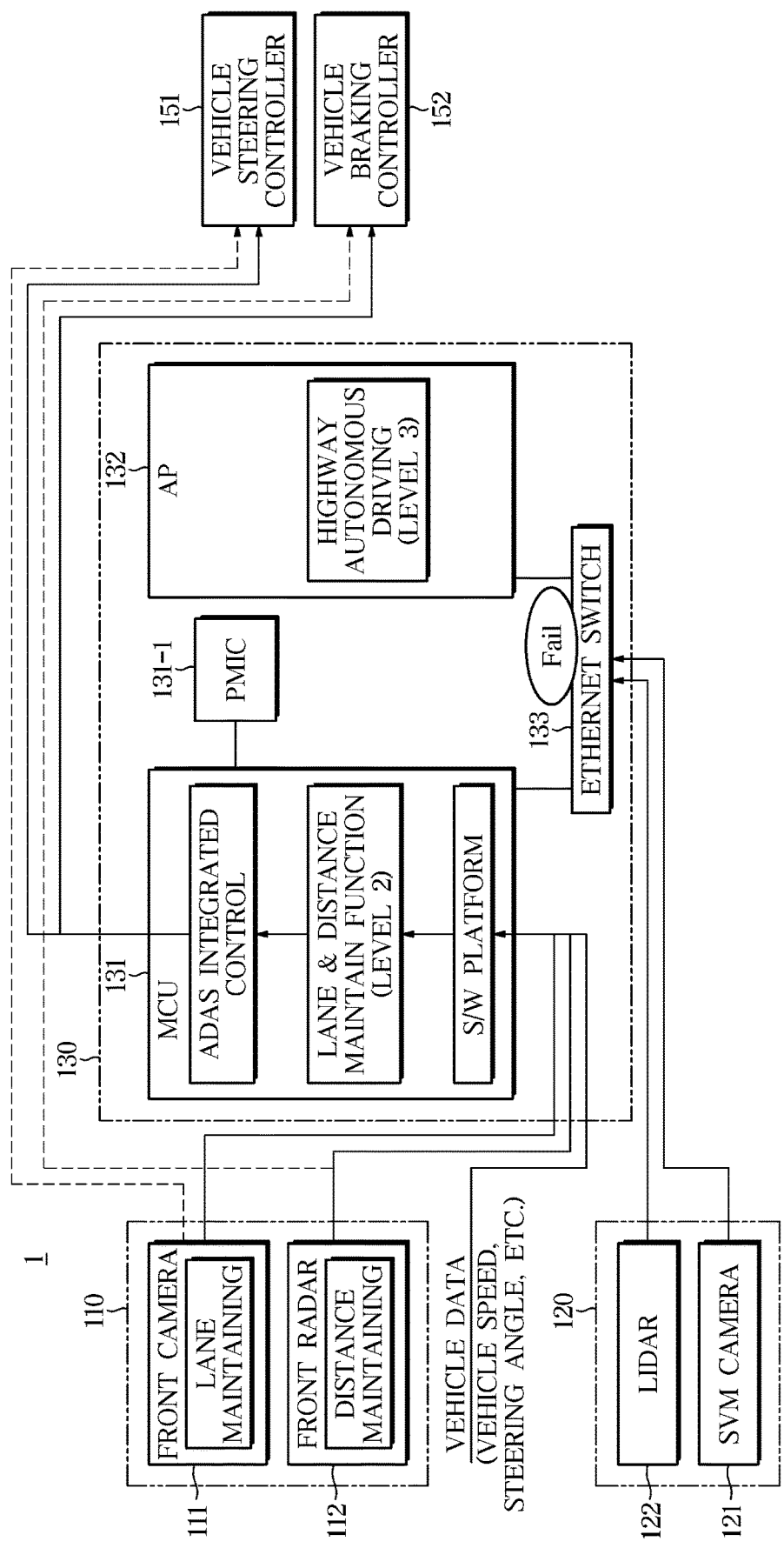
FIG. 5 is a diagram for explaining operations when a failure occurs in a communication unit.

FIG. 5 is a diagram for explaining an operation when a failure occurs in the communication unit 133 according to one form of the present disclosure.

Referring to FIGS. 2 and 5, when a failure occurs in the communication unit 133, the SVM camera and the lidar data cannot be transmitted to the second control module 132.

Therefore, the second control module 132 can determine that a failure has occurred in the communication unit based on such signal.

As described above, the second control module 132 can transmit the failure information of the communication unit 133 to the first control module 131.

When a failure occurs in the communication unit, the second control module 132 cannot receive the signal of the second sensor unit 120 based on the autonomous travel function. Therefore, the second control module 132 cannot perform the autonomous driving function. In this case, the first control module 131 can perform the vehicle steering/braking control by performing the autonomous driving function including the lane and inter-vehicle distance maintaining function based on the vehicle front information. In this case, the first sensor unit 110 may not operate the lane and inter-vehicle distance maintenance functions because the first control module 131 performs the lane and inter-vehicle distance maintenance function.

Figure 6:
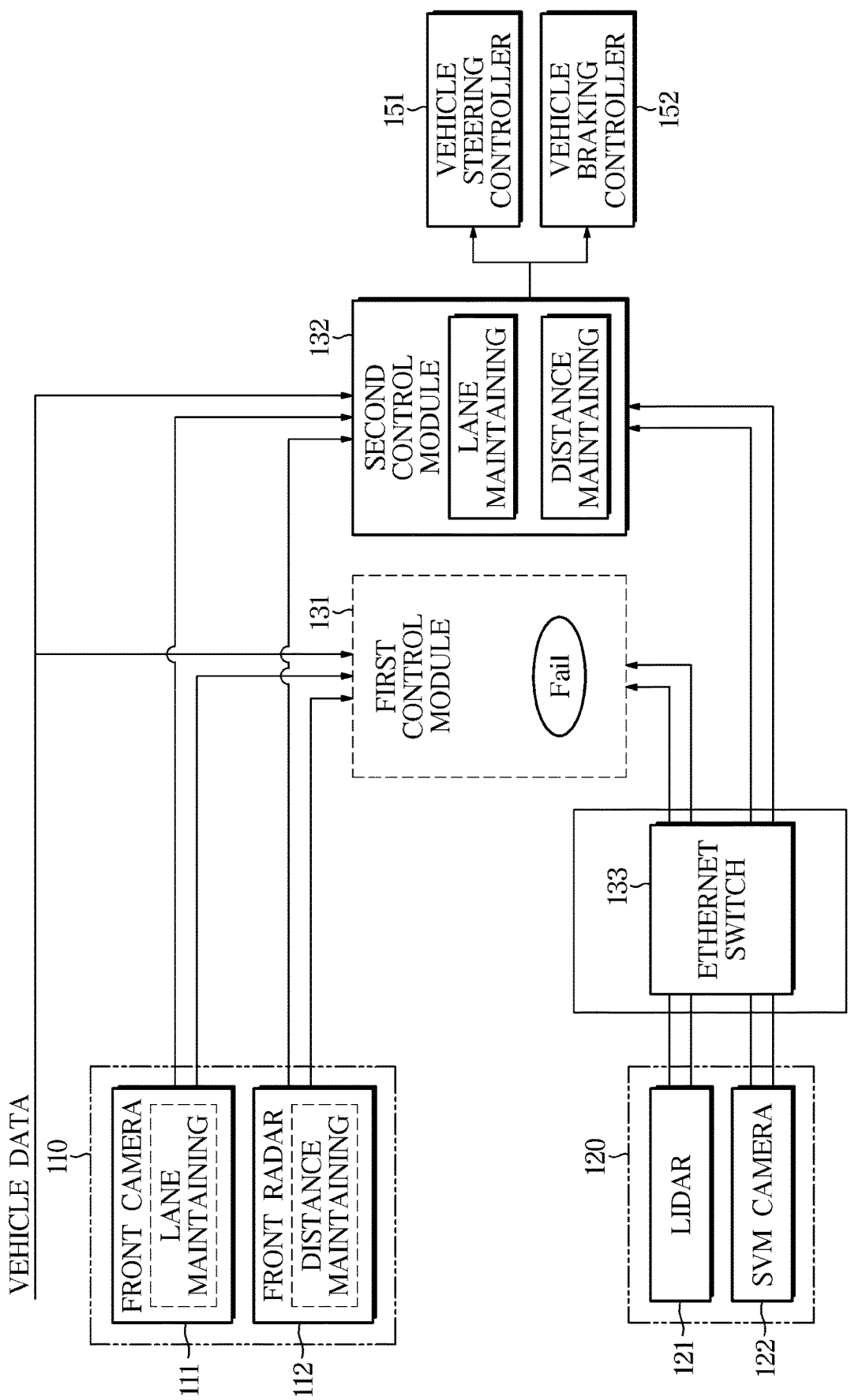
FIG. 6 is a view for explaining an operation when a parking assist system is activated.

FIG. 6 is a diagram for explaining an operation when a parking assist system is activated in another form of the present disclosure.

Referring to FIG. 6, the vehicle may further include the second control module 132 that performs a parking assist control function in addition to the first control module that performs the autonomous driving function itself.

When the vehicle includes the second control module 132 that performs a parking assist control function in addition to the control module that performs the autonomous driving function itself, the parking assist control module may additionally perform the lane keeping function and the headway distance maintaining function.

As described above, the first sensor unit 110 provided in the vehicle can perform the lane keeping function and the inter-vehicle distance maintaining function, and the control module itself can perform the lane keeping and the inter-vehicle distance maintaining function.

Also, the first control module 131 and the parking assist control module 132 may be connected through the communication unit.

When a failure occurs in the first control module 131, the communication unit 133 can detect that a failure has occurred in the first control module 131. When a failure occurs in the first control module 131, the vehicle lane keeping function and the inter-vehicle distance maintenance function performed by the first control module 131 are stopped, and the parking assist control module 132 performs the vehicle maintenance function and the headway distance maintenance function. That is, when a failure occurs in the first control module 131, the parking assist control module 132, which is one of the other control modules provided in the vehicle, can perform the lane keeping function and the headway distance maintaining function.

FIG. 7 is a diagram for explaining the operation of the output unit 140 according to one form of the present disclosure.

Referring to FIG. 7, When both the first control module 131 and the second control module 132 perform the autonomous driving function because the vehicle exceeds the predetermined speed, failure occurs in at least one of the first control module, the second control module 132 or the communication unit 133 as described above at time point t1, each module transfers the function performed by each module to another module, and each of the control modules can output a first warning signal S1 to the output unit.

Specifically, at a time point t1 when a failure occurs in at least one of the first control module 131, the second control module 132, or the communication unit, each of the control modules can transfer the control right to each other, so that the other control module carries out the lane keeping function and the headway distance maintenance function. In addition, the control module can output the first warning signal S1 to the output unit of the control module that has not generated a fault, and notify the driver of the failure. On the other hand, the output unit may include a warning lamp provided outside the vehicle as well as a display and a speaker provided inside the vehicle, and the operation of the output unit is not limited as long as the driver can recognize the failure of each of the control modules.

On the other hand, the control module having no failure can output the first warning signal S1 including the contents guiding the driver to transfer the control right to the output unit. If the driver does not transfer the control right for a predetermined time, the non-failed control module can output a second warning signal S2 to the output unit. On the other hand, a warning message output when a failure occurs in at least one of the first control module, the second control module, or the communication unit, and a warning message output after the predetermined time t1 after the output of the warning signal can be distinguished.

In the meantime, the operations that are explained in FIGS. 2 to 7 are merely an example for explaining an operation in which a different module performs a corresponding function when a failure occurs in each of the control modules in performing the autonomous driving function. In addition, there is no limitation on the type of module that performs a failure in each of the modules and the functions performed by the corresponding module in the operation.

FIG. 8 is a flowchart according to another form of the present disclosure.

Referring to FIG. 8, the first control module 131 and the second control module provided in the vehicle may be operated to perform the autonomous driving function (1001). Also, when the speed of the vehicle exceeds a predetermined speed, the first control module and the second control module may perform the autonomous driving function based on the peripheral information of the vehicle (1003).

In this case, if a failure occurs in the first control module, the first sensor unit can perform the autonomous driving function (1007). If a failure occurs in the second control module (1005), the first control module can perform the autonomous driving function (1008). In addition, when a failure occurs in the communication unit including the Ethernet switch of the vehicle, the first control module can perform the autonomous driving function (1008).

Meanwhile, the forms of the present disclosure may be implemented in the form of recording media for storing instructions to be carried out by a computer. The instructions may be stored in the form of program codes, and when executed by a processor, may generate program modules to perform an operation in the forms of the present disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

The exemplary forms of the present disclosure have thus far been described with reference to accompanying drawings. It will be obvious to those of ordinary skill in the art that the present disclosure may be practiced in other forms than the exemplary forms as described above without changing the technical idea or essential features of the present disclosure. The above exemplary forms are only by way of example, and should not be interpreted in a limited sense.

What is claimed is:

1. A vehicle comprising:
a first sensor unit comprising a first processor and configured to obtain front information of the vehicle;
a second sensor unit comprising a second processor and configured to acquire peripheral information of the vehicle;
a first controller configured to perform an autonomous driving function based on the front information;
a second controller configured to perform the autonomous driving function based on the front information of the vehicle and the peripheral information of the vehicle;
a communicator configured to transmit the front information of the vehicle and the peripheral information of the vehicle to the second controller; and
an auxiliary controller configured to determine whether the first controller and the second controller have failed,
wherein:
the first controller is configured to stop transmitting a control signal of the first controller when it is determined that a failure has occurred in the first controller, and the first sensor unit is configured to perform the autonomous driving function based on the obtained front information of the vehicle;
the second controller is configured to stop transmitting a control signal of the second controller when it is determined that a failure occurs in the second controller; and
the auxiliary controller is configured to control the first controller to stop a communication when it is determined that a failure has occurred in the first controller.

2. The vehicle according to claim 1,
wherein the second controller is configured to stop the transmission of the control signal from the second controller to the first controller when it is determined that the failure has occurred in the second controller.

3. The vehicle according to claim 1,
wherein the second controller is configured to transmit a failure signal of the communicator to the first controller when it is determined that a failure has occurred in the communicator.

4. The vehicle according to claim 1, further comprising;
an output unit configured to output a first warning signal when a failure occurs in at least one of the first controller, the second controller, or the communicator.

5. The vehicle according to claim 4,
wherein the communicator is configured to output a second warning signal when a predetermined time has elapsed since the output of the first warning signal.

6. The vehicle according to claim 1,
wherein the second controller is activated when the vehicle travels with a speed greater than a predetermined speed.

7. A control method of a vehicle, the method comprising:
obtaining, by a first sensor unit including a first processor, front information of the vehicle;

acquiring, by a second sensor unit including a second processor, peripheral information of the vehicle;

performing, by a first controller, an autonomous driving function based on the front information;

performing, by a second controller, the autonomous driving function based on the front information of the vehicle and the peripheral information of the vehicle;

stopping, by the first controller, transmitting a control signal when it is determined that a failure has occurred in the first controller;

stopping, by the second controller, transmitting a control signal when it is determined that a failure has occurred in the second controller;

determining, by an auxiliary controller, whether the first controller and the second controller have failed; and performing, by the first sensor unit, the autonomous driving function based on the obtained front information of the vehicle when it is determined that the failure has occurred in the first controller.

8. The control method of claim 7, wherein stopping the transmission of the control signal of the second controller includes stopping the transmission of the control signal from the second controller to the first controller when it is determined that the failure has occurred in the second controller.

9. The control method of claim 7, further comprising:

transmitting a failure signal of a communicator to the first controller when it is determined that a failure has occurred in the communicator.

10. The control method of claim 7, further comprising outputting a first warning signal when a failure occurs in at least one of the first controller, the second controller, or a communicator.

11. The control method of claim 10, further comprising:

outputting a second warning signal when a predetermined time has elapsed since the output of the first warning signal.

12. The control method of claim 7, wherein the second controller is activated when the vehicle travels with a speed greater than a predetermined speed.

* * * * *